United States Patent [19]

Hofbauer

[11] 4,437,443
[45] Mar. 20, 1984

[54] FUEL INJECTION DEVICE

[75] Inventor: Peter Hofbauer, Wolfsburg, Fed. Rep. of Germany

[73] Assignee: Volkswagenwerk AG, Wolfsburg, Fed. Rep. of Germany

[21] Appl. No.: 331,884

[22] Filed: Dec. 17, 1981

[30] Foreign Application Priority Data

Dec. 20, 1980 [DE] Fed. Rep. of Germany ....... 3048347

[51] Int. Cl.³ ...................... F02M 39/00; F02M 47/02
[52] U.S. Cl. .................................... 123/446; 123/447; 123/495; 123/467; 239/92
[58] Field of Search ............... 123/495, 447, 467, 446, 123/499, 498; 239/88-95

[56] References Cited

U.S. PATENT DOCUMENTS

| | | | |
|---|---|---|---|
| 2,015,887 | 10/1935 | Eek | 239/92 |
| 2,279,010 | 4/1942 | Nichols | 239/92 |
| 3,207,442 | 9/1965 | Kessler et al. | 239/92 |
| 4,170,974 | 10/1979 | Kopse | 123/467 |
| 4,222,358 | 9/1980 | Hofbauer | 123/495 |

Primary Examiner—Charles J. Myhre
Assistant Examiner—Carl Stuart Miller
Attorney, Agent, or Firm—Spencer & Frank

[57] ABSTRACT

In a fuel injection system including an injection distributor pump delivering fuel at a medium delivery pressure, a plurality of fuel injection valves each associated with a respective engine cylinder and each having a fuel injection opening for injecting fuel into its associated cylinder and a conduit leading to the injection opening, and a pressure booster associated with each valve and connected between the conduit of its associated valve and the pump for boosting the pressure at the opening from the medium pressure produced by the pump to a higher pressure required for fuel injection via the opening, the pressure booster associated with each valve being composed of a stepped piston having oppositely oriented end faces of unlike effective area, a housing in which the piston is slidably mounted and presenting a first working chamber associated with the larger end face of the piston and communicating with the pump, and a second working chamber associated with the smaller end face of the piston and communicating with the associated conduit, and a spring arrangement biasing the piston in one direction in the housing, each piston is composed of a first piston segment presenting the larger piston end face and a second piston segment separate from the first segment and presenting the smaller piston end face, the second segment presents a valve for selectively blocking communication between the conduit and the pump, and the spring arrangement is composed of two springs each acting separately on a respective one of the segments.

9 Claims, 3 Drawing Figures

FUEL INJECTION DEVICE

BACKGROUND OF THE INVENTION

The invention relates to a fuel injection device, especially for diesel internal combustion engines with direct injection.

Such fuel injection devices are disclosed, for example, in my U.S. Pat. No. 4,222,358. The stepped piston utilized in this fuel injection device provides the high fuel pressure necessary for the injection while the injection distributor pump connected ahead takes over the fuel distribution at a medium level pump pressure. The fuel pump required for such a fuel injection system accordingly needs to produce only a medium pressure and furthermore can operate with greater delivery quantities, whereby a substantially greater precision in the fuel regulation is made possible with the use of conventional distributor injection pumps.

In this known fuel injection device, a working chamber in the form of a bore associated with the smaller end face of the stepped piston is filled on the side of the injection valve by way of a connecting bore passing through the stepped piston, a ball valve fashioned as a check valve being arranged in this bore. However, since only a portion of the quantity of fuel supplied by the injection distributor pump, corresponding to the area ratio between the surface areas at the end faces of the stepped piston, is passed on from the stepped piston via the ball valve to the injection valve, measures must be taken to remove the residual portion of the metered quantity of fuel. In the known device, this proportion of the fuel would have to be returned into the fuel feed duct emanating from the injection distributor pump during the reverse, or return, movement of the stepped piston, and would have to be discharged from this duct by appropriate means. This, though, can lead to considerable difficulties. Moreover, the arrangement of a ball valve in the stepped piston will most probably be very difficult from an engineering standpoint.

SUMMARY OF THE INVENTION

It is an object of this invention to provide a fuel injection device of the type described above wherein the aforementioned difficulties are avoided.

A more specific object of the invention is to permit a safe filling of the working chamber associated with the smaller end face of the stepped piston and an effective removal of the excess fuel quantities supplied by the distributor injection pump.

The above and other objects are achieved, according to the present invention, in a fuel injection system including an injection distributor pump delivering fuel at a medium delivery pressure, a plurality of fuel injection valves each associated with a respective engine cylinder and each having a fuel injection opening for injecting fuel into its associated cylinder and a conduit leading to the injection opening, and a pressure booster associated with each valve and connected between the conduit of its associated valve and the pump for boosting the pressure at the opening from the medium pressure produced by the pump to a higher pressure required for fuel injection via the opening, the pressure booster associated with each valve being composed of a stepped piston having oppositely oriented end faces of unlike effective area, a housing in which the piston is slidably mounted and presenting a first working chamber associated with the larger end face of the piston and communicating with the pump, and a second working chamber associated with the smaller end face of the piston and communicating with the associated conduit, and a spring arrangement biasing the piston in one direction in the housing, by forming the piston of a first piston segment presenting the larger piston end face and a second piston segment separate from the first segment and presenting the smaller piston end face, providing the second segment with a valve structure for selectively blocking communication between the conduit and the pump, and constituting the spring arrangement of two springs each acting separately on a respective one of the segments.

By dividing the stepped piston, according to the invention, into a first piston segment presenting the piston portion with the larger end face and into a second piston segment presenting the piston portion with the smaller end face which, is additionally fashioned as a valve means by an appropriate spring loading, the difficulties associated with the accommodation of the ball valve are solved in a simple way. At the same time, this structure offers the possibility of obtaining an effective filling of the working chamber associated with the injection valve, as well as an advantageous removal of the excess fuel quantity delivered by the injection distributor pump, in that according to a further feature of the invention, when the two piston segments are spatially separated from the other, a communication is established between the two working chambers and a third working chamber, which latter is connected with the pressure medium outlet.

DESCRIPTION OF THE PREFERRED EMBODIMENTS

Figure 1:
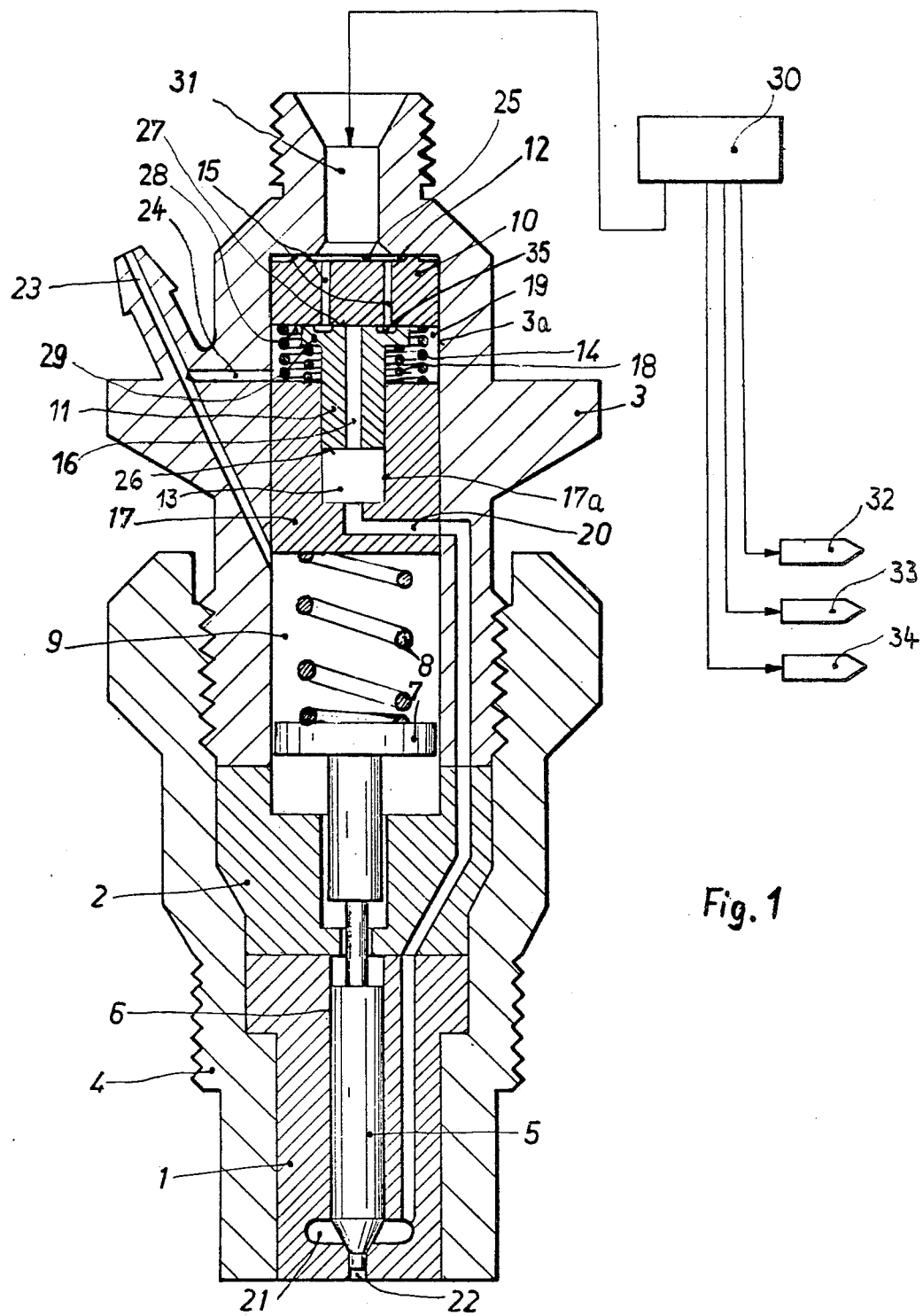
FIG. 1 shows, in longitudinal section, a fuel injection valve with stepped piston according to a preferred embodiment of the invention.

FIG. 1 shows an injection valve composed of a nozzle body 1 connected to a nozzle holder 3 together with an intermediate part 2 by means of a sleeve nut 4. A nozzle needle 5 is axially displaceable and sealingly supported in an axial bore 6 of the nozzle body 1, this nozzle needle being connected with a spring seat disc 7. The disc 7 is biased in the closing direction by a return spring 8 arranged in a cylindrical chamber 9 of the nozzle holder 3 and supported against the end face of a block 17 held in the nozzle holder 3. The intermediate part 2 serves here for limiting the stroke of the nozzle needle 5.

A stepped, or differential, piston made up of the two piston segments 10 and 11 is held in the nozzle holder 3, the larger diameter piston segment 10 sliding in a bore 3a formed in nozzle holder 3, and the smaller diameter piston segment 11 sliding in a bore 17a provided in the insert 17. The piston segment 10 is biased by a spring 14 held between one end of the insert 17 and the end face 28 of the piston segment 10. Spring 14 is disposed in a working chamber 19 associated with the end face 28 of the piston segment 10 and urges segment 10 away from block 17.

The other end face 25 of the piston segment 10 is associated with a working chamber 12 in communication via a connecting conduit 31 with a distributor injection pump 30 for feeding fuel at medium pressure thereto. The distributor injection pump 30 is in communication, on the other hand, with further injection valves 32–34 correlated with the other cylinders of the internal combustion engine. The injection distributor pump corresponds to conventional distributor pumps for precombustion chamber diesel engines and operates at a medium working pressure level at which operating medium pressures of between about 150 and 300 bar are attained.

The larger diameter piston segment 10 of the stepped piston is provided with essentially axially extending connecting ducts 15 running from the end face 25 associated with the working chamber 12 to the other end face 28 associated with the working chamber 19. The working chamber 19 is connected via a conduit 24 installed in the nozzle holder 3 to the pressure medium discharge conduit 23 removing leakage oil from the chamber 9.

The second, smaller diameter, piston segment 11 of the stepped piston presents, at its end facing the larger piston segment 10, a radially projecting annular shoulder 29 contacted by a compression spring 18 supported on the insert 17 and arranged, in parallel to the compression spring 14 biasing the larger piston segment 10, in the working chamber 19. The end face 27 of the smaller diameter piston segment 11 facing the larger piston segment 10 is ground to be planar and fashioned to be in sealing contact with the piston segment 10 in order to shut off the connecting ducts 15 of the piston segment 10. A bore 16, likewise extending substantially in the axial direction, extends from the end face 27 to the opposite end face 26 of the piston segment 11. The latter end face 26 is associated with a working chamber 13 formed by bore 17a in block 17, this working chamber 13 being in communication, via a conduit system 20 extending through the block 17, the nozzle holder 3, the intermediate part 2, and the nozzle body 1, with a pressure chamber 21 in the zone of the tip of the nozzle needle 5 directly upstream of the injection opening 22 of the injection valve.

By the installation of the stepped piston consisting of the two piston segments 10 and 11 into the nozzle holder 3 of the injection valve, the zone of the injection system operating under the high injection pressure is restricted to the injection valve proper so that the remaining conduit system remains relieved of this high pressure. The high operating pressure needed for purposes of direct injection is provided by the stepped piston 10, 11, which boosts the pressure as a function of the area ratio between the two end faces 25 and 26. At the same time, the quantity of fuel conveyed is reduced, so that the distributing system connected upstream of the injection valve operates not only at relatively low working pressures but also with relatively large flow rates, which can be effected technologically in a very much simpler fashion than distribution under high pressures and with small quantities, apart from the fact that distributor injection pumps capable of generating the high operating pressures of up to about 1000 bar required for direct injection have heretofore been entirely unknown.

Starting with the position of the injection valve as illustrated in FIG. 1, and with the conduit system 20, chamber 13 and bore 16 filled with fuel at the outlet pressure of pump 30, as the fuel supply duct 31 is exposed to the pressure generated by the distributor injection pump 30, first the stepped piston consisting of the two piston segments 10 and 11 is urged downwardly against the action of springs 14 and 18, resulting in an increased fuel pressure in the conduit system 20, the increase being a function of the area ratio between the end faces 25 and 26 of the stepped piston. This pressure lifts the nozzle needle 5 against the force of the return spring 8 so that a quantity of fuel which is adapted to the respective operating condition of the internal combustion engine can be injected via nozzle injection opening 22. The metering of the fuel quantity takes place upstream of the fuel injection valve in the region of the relatively low pump delivery pressure produced by the distributor injection pump 30, the delivery quantities being increased in correspondence with the area ratio between the end faces 25 and 26 of the stepped piston. This makes it possible to construct the metering device in a technically simpler manner with lower requirements concerning manufacturing tolerances. Additionally, the high injection pressure is restricted to the relatively short conduits incorporated into the compact parts of the fuel injection valve whereby the effect of conduit elasticities on the injected quantity can be substantially reduced.

Upon termination of a fuel delivery stroke, of the distributor injection pump 30, the pressure drops in the conduit system 20 and in the pressure chamber 21 so that the nozzle needle 5 acted upon by the return spring 8 is moved back again into the closed position wherein the injection opening 22 is blocked. Since depressurization also occurs in the fuel feed duct 31 communicating with the injection distributor pump 30, after the metered fuel quantity has been delivered, the stepped piston 10, 11 is urged back into the starting position shown in FIG. 1 by the two springs 14 and 18. This return movement of the two piston segments 10 and 11, however, does not take place in unison but rather sequentially.

In this procedure, the larger diameter piston segment 10 is first urged back into its starting position under the action of the spring 14 while being lifted off the smaller piston segment 11. This liftoff is achieved by the feature that the smaller diameter piston segment 11 is acted on by a pressure increase in the feed line 31 leading to the distributor injection pump 30 during return movement of the piston segment 10. This pressure is effective, via the connecting ducts 15 and an annular groove 35 in a portion of the end face 27, in opposition to the spring 18. This smaller diameter piston segment 11 therefore executes its return movement under the action of the spring 18 only with a certain delay. However, by the onset of the subsequent delivery stroke of the distributor injection pump 30, this piston segment 11 must have come into contact again with the larger piston segment 10 so that the connecting ducts 15 are blocked off.

When the two piston segments 10 and 11 are separated, the connecting ducts 15 and bore 16 associated with the two piston segments are in communication with the working chamber 19 connected to the outlet, and thus are also in communication with one another. In this way, during the return movement of the two pistons, the high-pressure portion of the injection valve, i.e. the working chamber 13, is refilled via the connecting bore 16, and furthermore excess fuel delivered by the distributor injection pump 30 is discharged from the working chamber 12 through the ducts 15 into the working chamber 19 and from there into the outlet 24, during which step the pressure produced in the feed conduit 31 during the return movement of the larger piston segment 10 is simultaneously reduced as well.

After termination of the return stroke, the smaller diameter piston segment 11 again comes into contact via its end face 27 against the end face 28 of the larger diameter piston segment 10, whereby the connecting ducts 15 and bore 16 are cut off from one another as well as from the working chamber 19. In this initial position, the stepped piston 10, 11 is again ready for another injection step initiated by the beginning of a new delivery stroke of the injection distributor pump 30.

Figure 2:
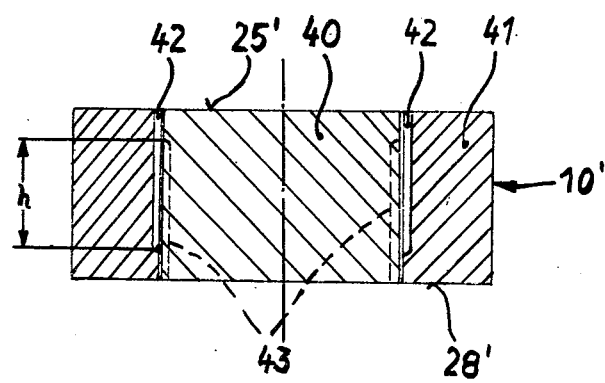
FIG. 2 is a longitudinal cross-sectional detail view of another embodiment of a piston segment of a stepped piston according to the invention.
Figure 3:
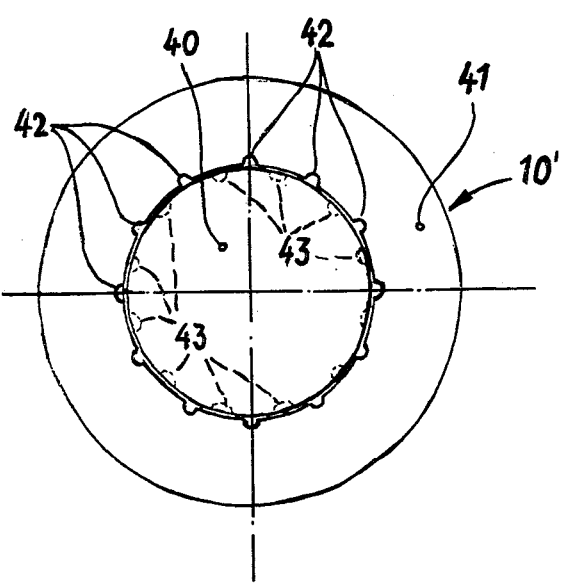
FIG. 3 is a top plan view of the piston segment of FIG. 2.

In FIGS. 2 and 3 of the drawing, an embodiment 10' of the larger diameter piston segment of the injection valve is shown in which the connecting ducts between the two end faces 25' and 28' are not fashioned to be smoothly continuous but rather are formed as a so-called filter cartridge, or rod-shaped filters. For this purpose, this piston segment is made of a cylindrical core piece 40 and an annular, cylindrical collar piece 41 surrounding the core piece 40 with a small clearance. The core piece 40 and the collar piece 41 are rigidly joined together, for example by braces or the like, not shown herein.

Axially extending grooves 43 and 42 are provided on the outer wall of the core piece 40 and on the inner wall of the annular, cylindrical collar piece 41, respectively, the grooves 42 beginning or ending at the end face 25' and the other grooves 43 beginning or ending at the end face 28', respectively. The lengths of grooves 42 and 43 are slightly less than the axial dimension of segment 10'. The grooves 42 and 43 are moreover offset with respect to each other in the peripheral direction so that there are no connecting ducts which extend directly all the way through.

Communication between the two end faces 25' and 28' is established, rather, by way of respectively proximate axial grooves 42 and 43 and interposed portions of the annular gap connecting these grooves and formed between the core piece 40 and the annular collar peice 41 of the piston segment 10'. Since these connecting gap portions are relatively narrow, but yet, on the other hand, also relatively long, being of the height h shown in FIG. 2, a sufficiently large passage area results for the pressure medium.

One purpose of such an arrangement, called rod-shaped filter, is that foreign bodies entrained with the pressure medium are thus prevented from passing on to the injection opening 22 and causing clogging at that location. Such foreign bodies are rather held up in the zone of the annular gap connections between the axial grooves 42 and 43 and can be disintegrated therein.

In order to prevent the foreign bodies entrained with the pressure medium from passing on to the injection opening 22 and to smash or disintegrate these foreign bodies the annular gap formed between the core piece 40 and the annular collar piece 41 may have a size of about 20 μm (0,02 mm) or less in radial direction.

The embodiments of the injection valve illustrated in the drawings are, of course, merely exemplary and have, furthermore, been shown somewhat schematically. Of course, a large number of other forms of construction are possible which can contain the stepped piston as disclosed herein. The essential concept in the present invention is, therefore, the divided design of the stepped piston wherein both piston segments are spring-loaded and separate from each other during the return motion to connect their passage ducts with one another as well as with the outlet. The injection device of this invention can, of course, also work with pumps other than distributor injection pumps, for example also with series-type injection pumps.

It will be understood that the above description of the present invention is susceptible to various modifications, changes and adaptations, and the same are intended to be comprehended within the meaning and range of equivalents of the appended claims.

What is claimed is:

1. In a fuel injection system including at least one injection pump delivering fuel at a medium delivery pressure, at least one fuel injection valve associated with a respective engine cylinder and having a fuel injection opening for injecting fuel into its associated cylinder and a conduit leading to the injection opening, and pressure booster means associated with said valve and connected between said conduit and the pump for boosting the pressure at the opening from the medium pressure produced by the pump to a higher pressure required for fuel injection via the opening, the pressure booster means associated with said valve being composed of a stepped piston having oppositely oriented end faces of unlike effective area, a housing in which the piston is slidably mounted and presenting a first working chamber associated with the larger end face of the piston and communicating with the pump, and a second working chamber associated with the smaller end face of the piston and communicating with the associated conduit, and spring means biasing the piston in one direction in the housing, the improvement wherein: said piston comprises a first piston segment presenting the larger piston end face and a second piston segment separate from said first segment and presenting the smaller piston end face; said second segment comprises valve means for selectively blocking communication between said conduit and the pump; and said spring means comprise two springs each acting separately on a respective one of said segments.

2. A system as defined in claim 1 wherein said housing presents a third working chamber located axially between said first and second chambers, said first segment is provided with at least one fuel flow duct extending in the axial direction of said piston between the end faces of said first segment, and said second segment is biased by its associated spring into contact against said first segment for closing said valve means to block communication between said duct and said third chamber.

3. A system as defined in claim 1 wherein said housing presents a third working chamber located axially between said first and second chambers, said second segment is provided with a fuel flow duct extending in the axial direction of said piston between the end faces of said second segment, and said second segment is biased by its associated spring into contact against said first segment for closing said valve means to block communication between said duct and said third chamber.

4. A system as defined in claim 2 or 3 wherein said third chamber is located adjacent the end of said first segment facing away from said first chamber pump and is in communication with a pressure medium outlet.

5. A system as defined in claim 2 or 3 wherein said duct has the form of a rod-shaped filter.

6. A system as defined in claim 2 wherein that one of said springs acting on said first segment is located in said third working chamber.

7. A system as defined in claim 1, 2, 3 or 6 wherein said second segment is provided, at the end thereof facing said first segment, with an annular shoulder acted upon by that one of said springs acting on said second segment, and the end face of said second segment directed toward said first segment is formed to contact said first segment to close said valve means.

8. A system as defined in claim 1 wherein said first and second segments are movable relative to one another.

9. A system as defined in claim 8 wherein said first segment is formed to contact said second segment to close said valve means.

* * * * *